US009067615B2

(12) United States Patent
Kashiwai et al.

(10) Patent No.: US 9,067,615 B2
(45) Date of Patent: Jun. 30, 2015

(54) ELECTRIC SADDLE-RIDDEN VEHICLE

(71) Applicant: Honda Motor Co., Ltd., Minato-ku, Tokyo (KE)

(72) Inventors: Mikio Kashiwai, Wako (JP); Yoshitaka Kobayashi, Wako (JP); Hiroyuki Kikuchi, Wako (JP); Shinji Kawatani, Wako (JP)

(73) Assignee: Honda Motor Co., Ltd., Tokyo ( * ) Notice: Subject to any disclaimer, the term of this patent is extended or adjusted under 35 U.S.C. 154(b) by 0 days.

(21) Appl. No.: 14/359,638

(22) PCT Filed: Nov. 12, 2012

(86) PCT No.: PCT/JP2012/079275
§ 371 (c)(1),
(2) Date: May 21, 2014

(87) PCT Pub. No.: WO2013/077214
PCT Pub. Date: May 30, 2013

(65) Prior Publication Data
US 2014/0339006 A1 Nov. 20, 2014

(30) Foreign Application Priority Data

Nov. 25, 2011 (JP) .................................. 2011-258088

(51) Int. Cl.
*B62D 61/02* (2006.01)
*B62B 7/12* (2006.01)
(Continued)

(52) U.S. Cl.
CPC . *B62B 7/12* (2013.01); *B62K 25/28* (2013.01); *B62L 1/00* (2013.01); *B62K 11/10* (2013.01);
(Continued)

(58) Field of Classification Search
CPC .. B62K 2204/00; B62K 2202/00; B62M 7/12
USPC ......................................... 180/220, 219, 65.1
See application file for complete search history.

(56) References Cited

U.S. PATENT DOCUMENTS

| 5,313,191 A * | 5/1994 | Yamashita et al. ............ 340/439 |
| 8,527,171 B2 | 9/2013 | Sugano et al. |
| 2013/0002179 A1 * | 1/2013 | Ozaki et al. .............. 318/400.21 |

FOREIGN PATENT DOCUMENTS

| JP | 2003-127941 A | 5/2003 |
| JP | 2010-247815 A | 11/2010 |

(Continued)

OTHER PUBLICATIONS

Official Communication issued Apr. 16, 2015 in the corresponding Japanese Patent Application 2013-545882.

*Primary Examiner* — Kevin Hurley
*Assistant Examiner* — Marlon Arce
(74) *Attorney, Agent, or Firm* — Carrier Blackman & Associates, P.C.; Joseph P. Carrier; William D. Blackman

(57) ABSTRACT

In an electric saddle-ridden vehicle including a swing arm, a power unit supported on an arm portion of the swing arm while having an electric motor and a reduction gear reducing in speed an output of the electric motor and transmitting it to a wheel side of the rear wheel, and a wheel brake provided on the wheel, the power unit is arranged so that the reduction gear is disposed to one side in the vehicle width direction with the rear wheel on the opposite side with respect to the electric motor and the electric motor is disposed closer to a vehicle body center line than the reduction gear in the vehicle width direction, and the wheel brake is provided on the wheel so as to be capable of being accessed from the other side in the vehicle width direction, which is the side opposite to the power unit.

9 Claims, 13 Drawing Sheets

(51) Int. Cl.
*B62K 25/28* (2006.01)
*B62L 1/00* (2006.01)
*B62K 11/10* (2006.01)
*F16D 65/02* (2006.01)
*B60K 7/00* (2006.01)
*B60K 17/04* (2006.01)
*B60T 11/04* (2006.01)
*F16D 51/20* (2006.01)
*F16D 125/64* (2012.01)

(52) U.S. Cl.
CPC ............... *F16D 65/02* (2013.01); *B62K 25/283* (2013.01); *B62K 2202/00* (2013.01); *B60K 7/0007* (2013.01); *B60K 2007/0038* (2013.01); *B60K 2007/0092* (2013.01); *B60Y 2200/126* (2013.01); *B60Y 2304/07* (2013.01); *B60K 17/043* (2013.01); *B60K 17/04* (2013.01); *B60T 11/04* (2013.01); *F16D 51/20* (2013.01); *F16D 2125/64* (2013.01); *B62K 2204/00* (2013.01)

(56) References Cited

FOREIGN PATENT DOCUMENTS

| | | |
|---|---|---|
| JP | 2011-051419 A | 3/2011 |
| WO | 2010/109969 A1 | 9/2010 |

\* cited by examiner

ELECTRIC SADDLE-RIDDEN VEHICLE

TECHNICAL FIELD

The present invention relates to an electric saddle-ridden vehicle that includes a cantilever type swing arm that has a swinging support portion pivotably supported on a vehicle body frame and an arm portion provided to be connected to one side, in a vehicle width direction, of the swinging support portion so as to be disposed on one side of a rear wheel, a power unit that is supported on the arm portion while having an electric motor exerting power for driving the rear wheel and a reduction gear reducing in speed an output of the electric motor and transmitting the output to a wheel side of the rear wheel, and a wheel brake that is provided on the wheel.

BACKGROUND ART

Such an electric saddle-ridden vehicle is already known from Patent Document 1.

RELATED ART DOCUMENTS

Patent Documents

Patent Document 1: Japanese Patent Application Laid-open No. 2010-247811.

SUMMARY OF THE INVENTION

Problems to be Solved by the Invention

In the arrangement disclosed in Patent Document 1 above, an electric motor, a reduction gear, and a wheel of a rear wheel are disposed in sequence from one side, in the vehicle width direction, in a direction along the axis of an axle of the rear wheel, and a drum brake as a wheel brake is provided on the wheel so that it can be accessed from the reduction gear side. In accordance with such an arrangement, although it is easy to access a tire of the rear wheel, which has a high priority for maintenance, it cannot be said that the weight balance is good because the electric motor, which is heavy, is disposed offset to one side, in the vehicle width direction, from the vehicle body center in the vehicle width direction.

The present invention has been accomplished in light of such circumstances, and it is an object thereof to provide an electric saddle-ridden vehicle having a good weight balance while enabling a tire, which has a high priority for maintenance, to be easily accessed.

Means for Solving the Problems

In order to attain the above object, according to a first aspect of the present invention, there is provided an electric saddle-ridden vehicle comprising a cantilever type swing arm that has a swinging support portion pivotably supported on a vehicle body frame and an arm portion provided to be connected to one side, in a vehicle width direction, of the swinging support portion so as to be disposed on one side of a rear wheel, a power unit that is supported on the arm portion while having an electric motor exerting power for driving the rear wheel and a reduction gear reducing in speed an output of the electric motor and transmitting the output to a wheel side of the rear wheel, and a wheel brake that is provided on the wheel, characterized in that the power unit is arranged so that the reduction gear is disposed to one side in the vehicle width direction with the rear wheel on the opposite side with respect to the electric motor and the electric motor is disposed closer to a vehicle body center line than the reduction gear in the vehicle width direction, and the wheel brake is provided on the wheel so as to be capable of being accessed from the other side in the vehicle width direction, which is the side opposite to the power unit.

Further, according to a second aspect of the present invention, in addition to the first aspect, a wheel hub of the wheel is formed so as to integrally have an inner tube portion through which an axle of the rear wheel is inserted, an outer tube portion that coaxially surrounds the inner tube portion, and a linking wall that links end parts, on the power unit side, of the inner tube portion and the outer tube portion, and the wheel brake is a drum brake having a brake drum that is provided on an inner periphery of the outer tube portion and a brake panel that is relatively rotatably supported on the axle so as to close an open end, on the side opposite to the power unit, between the inner tube portion and the outer tube portion.

According to a third aspect of the present invention, in addition to the second aspect, a bearing is disposed between the brake panel and the axle, and a rotation-preventing member that restricts rotation of the brake panel is provided between the swinging support portion and the brake panel.

According to a fourth aspect of the present invention, in addition to the third aspect, secured portions are formed on front and rear end parts of the rotation-preventing member, which is formed into a rod shape extending in the fore-and-aft direction of the vehicle body frame, mounting parts for securing the secured portions are provided on the swinging support portion and the brake panel respectively so as to be superimposed on the secured portions, a bolt inserted through the secured portion and the mounting part, which are superimposed on one another, is formed with a step while integrally having an enlarged diameter head portion that abuts against and engages with one of the secured portion and the mounting part, a through-shaft portion that is coaxially connected to the enlarged diameter head portion so as to extend through the secured portions and the mounting parts, which are superimposed on one another, and a threaded shaft portion that is formed so as to have a smaller diameter than a diameter of the through-shaft portion and is coaxially connected to the through-shaft portion, and a nut is screwed onto the threaded shaft portion with an elastic member disposed between the nut and the mounting part or secured portion.

According to a fifth aspect of the present invention, in addition to the second aspect, a plurality of spokes link a rim of the wheel and the wheel hub, which is disposed so as to be offset toward the other side in the vehicle width direction from the center of the rim in a direction along an axis of the axle, the plurality of spokes being inclined so as to be positioned on the other side in the vehicle width direction in going toward the wheel hub side.

According to a sixth aspect of the present invention, in addition to the fifth aspect, at least part of the electric motor is disposed within a width of a tire fitted around the rim, and at least part of the drum brake is disposed at a position that is offset to the outside from the width of the tire.

According to a seventh aspect of the present invention, in addition to the second aspect, a motor shaft of the electric motor is operatively linked to the reduction gear, which is disposed on one side, in the vehicle width direction, of the electric motor, and the motor shaft is formed into a tubular shape so that the axle to which the rotational power is transmitted from the reduction gear extends therethrough.

According to an eighth aspect of the present invention, in addition to the seventh aspect, a power unit case housing the power unit is formed by joining a case main body supported on the arm portion of the swing arm, a motor cover forming between the motor cover and the case main body a motor housing the electric motor, and a reduction gear cover forming between the reduction gear cover and the case main body a reduction gear housing the reduction gear, the axle rotatably extending through the motor cover is rotatably supported on both the reduction gear cover and the motor cover, and the motor shaft is rotatably supported on both the axle and the case main body.

Moreover, according to a ninth aspect of the present invention, in addition to the first aspect, the power unit is detachably mounted on the arm portion.

A drum brake 80 of an embodiment corresponds to the wheel brake of the present invention, a seventh ball bearing 84 of the embodiment corresponds to the bearing of the present invention, and a plate spring 117 and a rubber material 118 of the embodiment correspond to the elastic member of the present invention.

Effects of the Invention

In accordance with the first aspect of the present invention, the power unit is arranged such that the reduction gear is disposed to one side in the vehicle width direction with the rear wheel on the opposite side with respect to the electric motor, and the electric motor is disposed closer to the vehicle body center line side than the reduction gear in the vehicle width direction. The wheel brake is provided on the wheel so as to be accessed from the other side in the vehicle width direction, which is the side opposite to the power unit; it is therefore possible to easily access, from the other side in the vehicle width direction, the tire and the wheel brake, which have a high priority for maintenance, while eliminating the necessity for removing not only the electric motor and the reduction gear but also the wheel brake when changing the tire and also eliminating the necessity for removing the tire when carrying out maintenance of the wheel brake and, moreover, it is possible to obtain a good weight balance by disposing the electric motor, which is heavy, close to the vehicle body center line in the vehicle width direction.

Furthermore, in accordance with the second aspect of the present invention, the wheel brake is a drum brake provided on a wheel hub, thus enabling a compact structure to be achieved.

In accordance with the third aspect of the present invention, since the rotation-preventing member for restricting rotation of the brake panel forming part of the drum brake is provided between the swinging support portion and the brake panel, it is possible to support the power unit solely by the arm portion of the cantilever type swing arm and receive the rotational force acting on the brake panel solely by the swinging support portion.

In accordance with the fourth aspect of the present invention, the secured portions, which are formed in the front and rear end parts respectively of the rotation-preventing member formed into a rod shape extending in the fore-and-aft direction of the vehicle body frame, and the mounting parts, which are provided on both the swinging support portion and the brake panel so as to be superimposed on the secured portions, are secured by means of the bolt, which is inserted through the secured portion and the mounting part, and the nut, which is screwed onto the threaded shaft portion of the bolt with the elastic member disposed between the nut and the mounting part or the secured portion, and since the secured portion and the mounting part are not firmly tightened between the nut and the enlarged diameter head portion of the bolt even in a state in which the nut is tightened, it is easy to remove them and, moreover, it is inexpensive because it is not necessary to strictly determine the dimensional tolerance.

In accordance with the fifth aspect of the present invention, the wheel hub is disposed so as to be offset toward the other side in the vehicle width direction from the center of the rim in a direction along the axis of the axle, the rim and the wheel hum are linked by means of the plurality of spokes, which are inclined so as to be positioned on the other side in the vehicle width direction in going toward the wheel hub side, and it is therefore possible to dispose the electric motor closer to the vehicle body center line in the vehicle width direction and to dispose the drum brake at a position offset from the vehicle body center line toward the other side in the vehicle width direction, which is the side opposite to the power unit.

In accordance with the sixth aspect of the present invention, at least part of the electric motor is disposed within the width of the tire, and at least part of the drum brake is disposed so as to be offset to the outer side from the width of the tire; it is therefore possible to dispose the electric motor more markedly close to the vehicle body center line in the vehicle width direction and to dispose the drum brake so as to be more markedly offset toward the other side in the vehicle width direction from the vehicle body center line. Moreover, the weight balance between the power unit and the rear wheel in the vehicle width direction can be equalized.

In accordance with the seventh aspect of the present invention, since the motor shaft of the electric motor is formed into a tubular shape so that the motor shaft is operatively linked to the reduction gear and has the axle extending therethrough, the rotational power from the reduction gear being transmitted to the axle, it is possible to compactly form the power transmission system, which extends from the electric motor to the axle, while disposing the electric motor close to the vehicle body center line in the vehicle width direction.

In accordance with the eighth aspect of the present invention, since the power unit case is formed from the case main body, the motor cover forming the motor housing between itself and the case main body and joined to the case main body, and the reduction gear cover forming the reduction gear housing between itself and the case main body and joined to the case main body, the axle is rotatably supported on both the reduction gear cover and the motor cover, and the motor shaft is rotatably supported on both the axle and the case main body, it is possible to support the rear wheel solely by the cantilever type swing arm.

Furthermore, in accordance with the ninth aspect of the present invention, since the power unit is detachably mounted on the arm portion, a wider variety of ways of carrying out maintenance become possible.

EXPLANATION OF REFERENCE NUMERALS AND SYMBOLS

Figure 1:
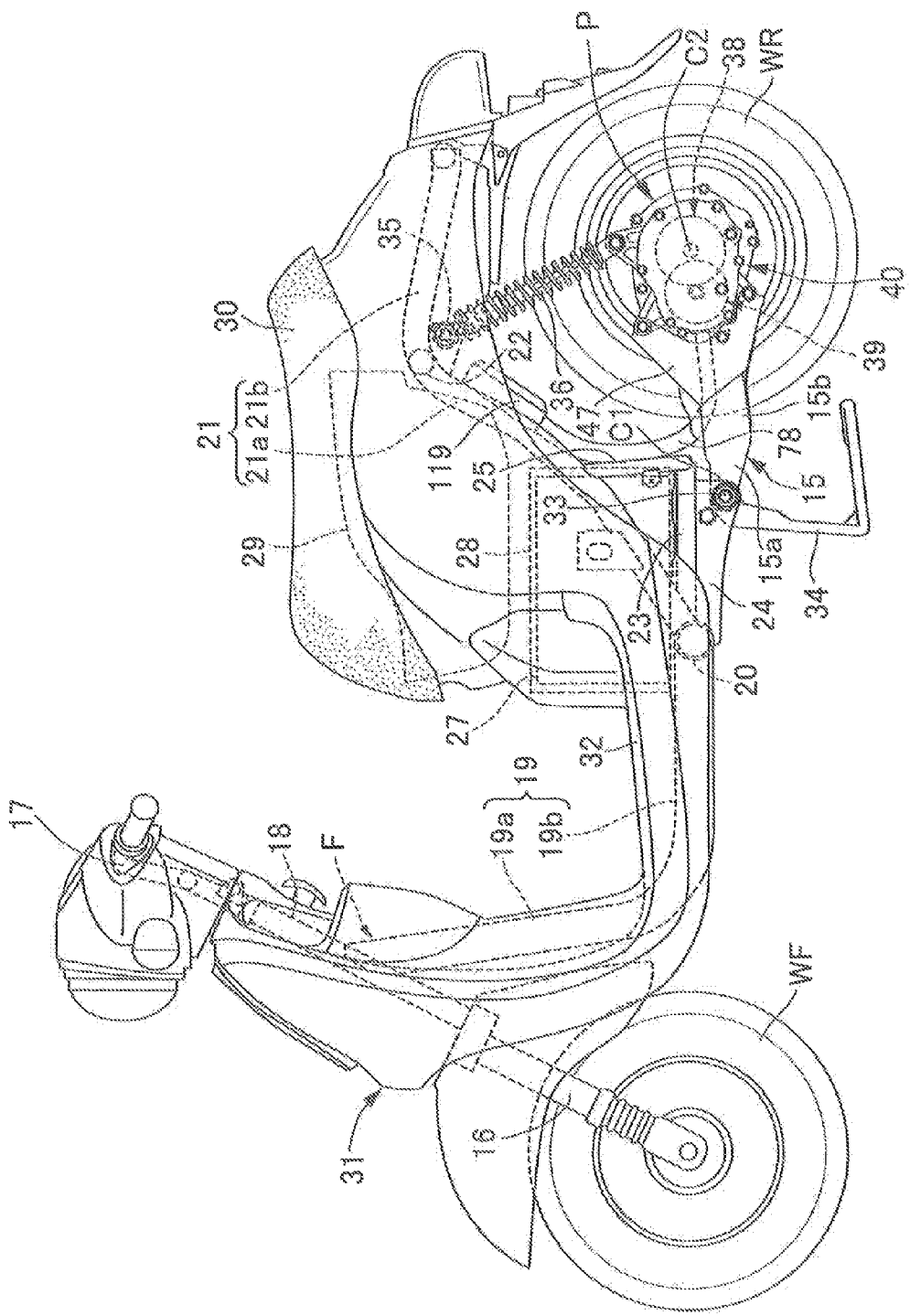
FIG. 1 is a left side view of an electric scooter. (first embodiment)

15 Swing arm
15a Swinging support portion
15b Arm portion
38 Electric motor
39 Reduction gear
40 Power unit case
41 Wheel
42 Case main body
43 Motor cover
44 Reduction gear cover
45 Motor housing
46 Reduction gear housing
57 Axle
58 Motor shaft
74 Wheel hub
74a Inner tube portion
74b Outer tube portion
74c Linking wall
75 Rim
76 Spoke
77 Tire
80 Drum brake, which is a wheel brake
81 Brake drum
82 Brake panel
84 Seventh ball bearing, which is a bearing
90 Rotation-preventing member
90a, 90b Secured portion
91, 92 Mounting part
93 Bolt
93a Enlarged diameter head portion
93b Through-shaft portion
93c Threaded shaft portion
94 Nut
117 Plate spring, which is an elastic member
118 Rubber material, which is an elastic member
CL Vehicle body center line
F Vehicle body frame
P Power unit
W Tire width
WR Rear wheel

MODES FOR CARRYING OUT THE INVENTION

A mode for carrying out the present invention is explained by reference to the attached FIG. 1 to FIG. 13. In the explanation below, each of front and rear, upper and lower, and left and right directions is the direction when viewed by a rider seated on an electric scooter.

First Embodiment

First, in FIG. 1, this electric saddle-ridden vehicle is an electric scooter having a low floor 32, and the arrangement is such that a rear wheel WR is rotatingly driven by means of rotational power exerted by a power unit P provided in a rear part of a cantilever type swing arm 15, the rear wheel WR being axially supported by the power unit P.

Figure 2:
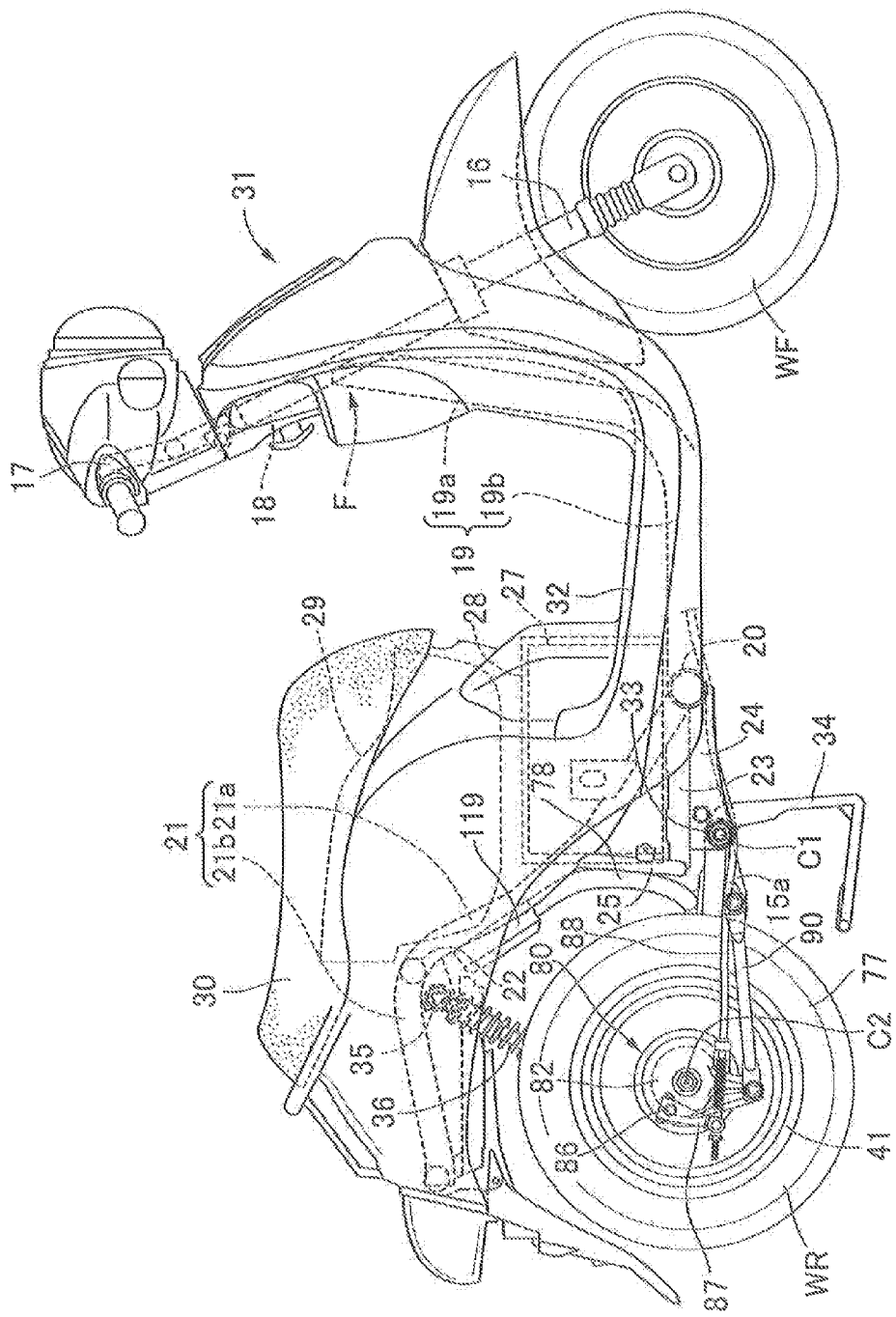
FIG. 2 is a right side view of the electric scooter. (first embodiment)

Referring in addition to FIG. 2, a vehicle body frame F of the electric scooter includes a head pipe 18 that steerably supports a front fork 16, axially supporting a front wheel WF, and handlebars 17 linked to an upper part of the front fork 16, a main frame 19 that has a front end part joined to the head pipe 18, a cross pipe 20 that is provided in a rear end part of the main frame 19 while extending in the vehicle width direction, a pair of left and right rear frames 21 and 21 that each have front ends provided to be connected to opposite end parts of the cross pipe 20, a cross member 22 that joins intermediate parts of the two rear frames 21, a pair of subframes 23 and 23 that are provided to be connected to the cross pipe 20 inside the pair of rear frames 21 and extend rearwardly from the cross pipe 20, and a pair of pivot frames 24 and 24 that are each provided to be connected to lower parts of the subframes 23 and extend downwardly.

The main frame 19 is formed by bending a single pipe while integrally having a down frame 19a that extends downwardly to the rear from the head pipe 18, and a lower frame 19b that extends rearwardly substantially horizontally from the rear end of the down frame 19a so as to be covered by the low floor from above.

Figure 3:
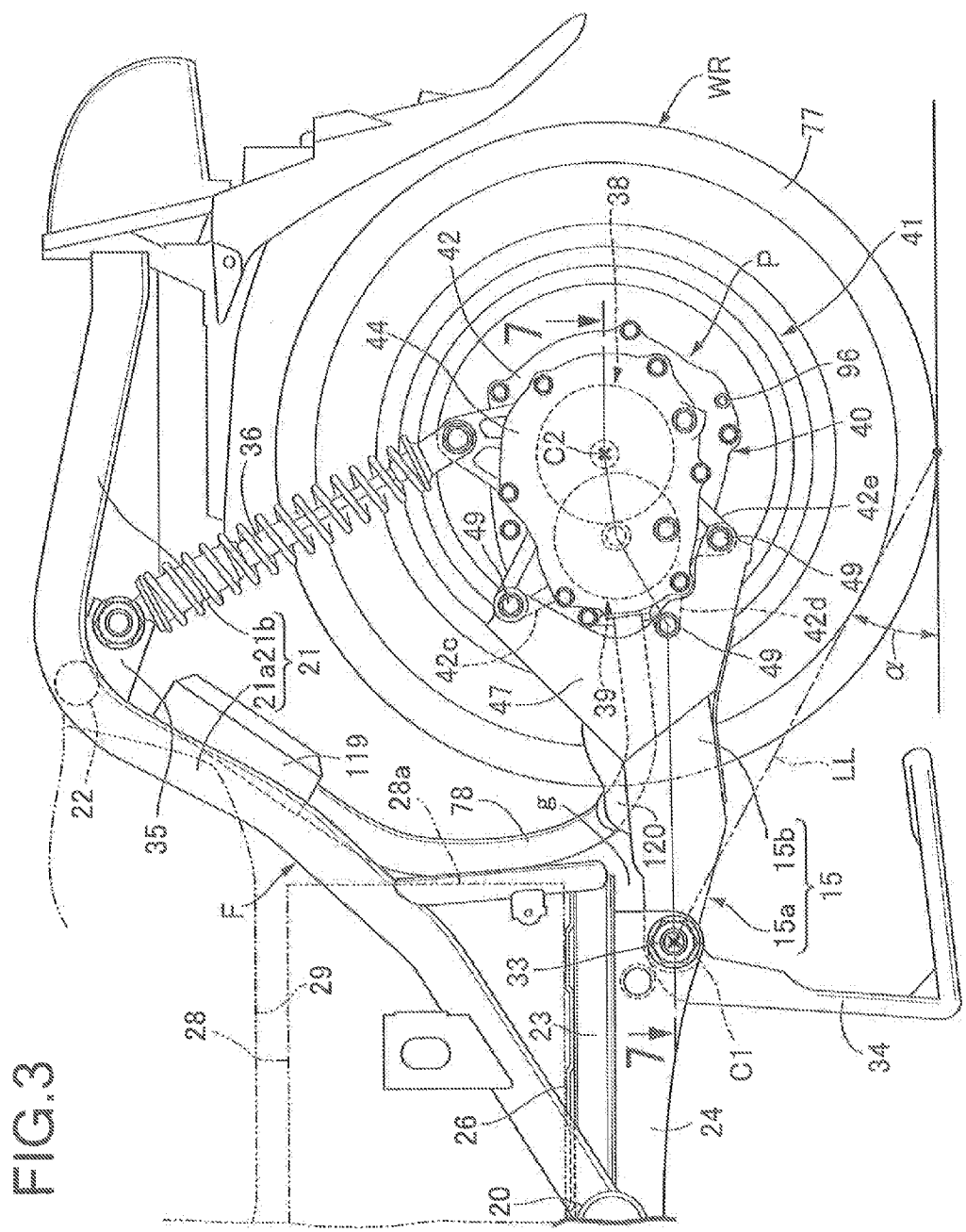
FIG. 3 is an enlarged view of an essential part in FIG. 1. (first embodiment)
Figure 4:
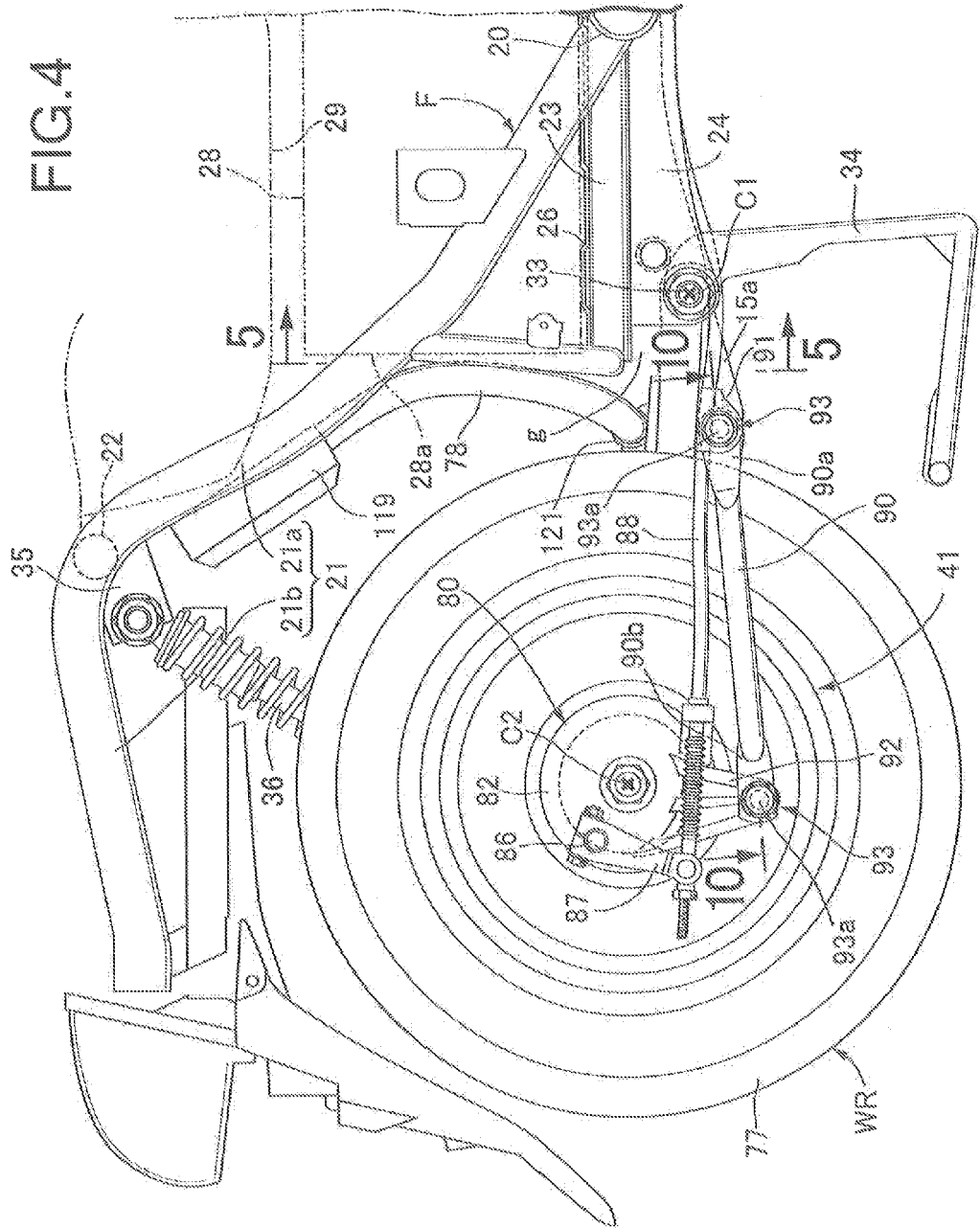
FIG. 4 is an enlarged view of an essential part in FIG. 2. (first embodiment)

Referring in addition to FIG. 3 and FIG. 4, a middle part in the vehicle width direction of the cross pipe 20 is fixed to a rear end part of the lower frame 19b of the main frame 19, and front end parts of the pair of the rear frames 21 are fixed to the opposite end parts of the cross pipe 20. That is, the rear frame 21 is provided to be connected to the rear end part of the lower frame 19b via the cross pipe 20. The rear frame 21 is formed so as to be inclined upwardly to the rear at least beneath a riding seat 30, and in this embodiment the rear frame 21 is formed by bending a single pipe while integrally having a front inclined frame 21a that is inclined upwardly to the rear from a left or right end part of the cross pipe 20 so as to extend upwardly and is disposed beneath the riding seat 30, and a rear inclined frame 21b that is slightly inclined downwardly to the rear from the rear end of the front inclined frame 21a so as to extend rearwardly. Connected parts of the front inclined frames 21a and the rear inclined frames 21b of the two rear frames 21 are linked by means of the cross member 22.

Figure 5:
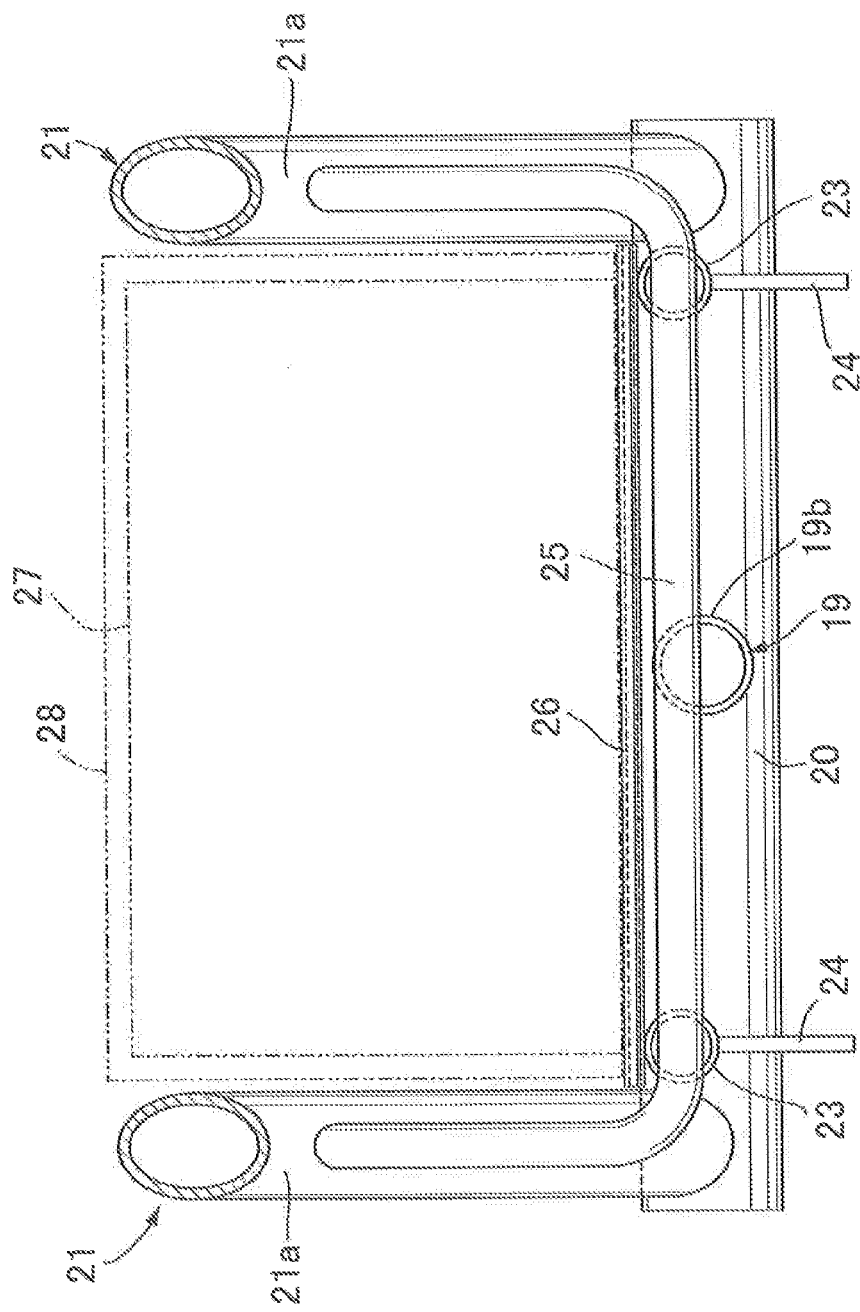
FIG. 5 is a sectional view along line 5-5 in FIG. 4. (first embodiment)

Referring in addition to FIG. 5, the subframes 23 are provided to be connected to rear faces of opposite end parts of the cross pipe 20 at positions close to the rear frames 21 on the inside and extend rearwardly, and the pivot frames 24 are provided to be connected to lower parts of the subframes 23 so as to extend downwardly from the subframes 23.

A mounting plate 26 is disposed above the cross pipe 20 between the pair of left and right subframes 23, and a battery box 28 housing a battery 27 and disposed between the pair of left and right rear frames 21 is supported by the two subframes 23 so as to be carried on the mounting plate 26. That is, the battery box 28 is supported by the subframes 23 so as to be disposed above the cross pipe 20.

Furthermore, a storage box 29 is disposed above the battery box 28 while being supported by the pair of left and right rear frames 21, and this storage box 29 supports the riding seat 30 so that it can be opened and closed, the riding seat 30 covering the storage box 29 from above. The battery box 28 is disposed between the pair of left and right rear frames 21 beneath the riding seat 30.

A reinforcing frame 25 made into a substantially U-shaped form opening upwardly is fixed to rear end parts of the pair of subframes 23, and opposite end parts of the reinforcing frame 25 are fixed to intermediate parts of the front inclined frames 21a of the rear frames 21.

The vehicle body frame F, part of the battery box 28, and the storage box 29 are covered by a vehicle body cover 31 having the low floor 32 for an occupant seated on the riding seat 30 to put their feet on.

A front end part of the cantilever type swing arm 15 is swingably supported on the pivot frames 24 of the vehicle body frame F via a single support shaft 33, and a main stand 34 is pivotably supported on the support shaft 33, the main stand 34 and the swing arm 15 having the same pivot axis. Furthermore, a rear cushion unit 36 is provided between the power unit P provided on the rear part of the swing arm 15 and a bracket 35 provided, among the two rear frames 21, on a rear part of the left rear frame 21.

Figure 6:
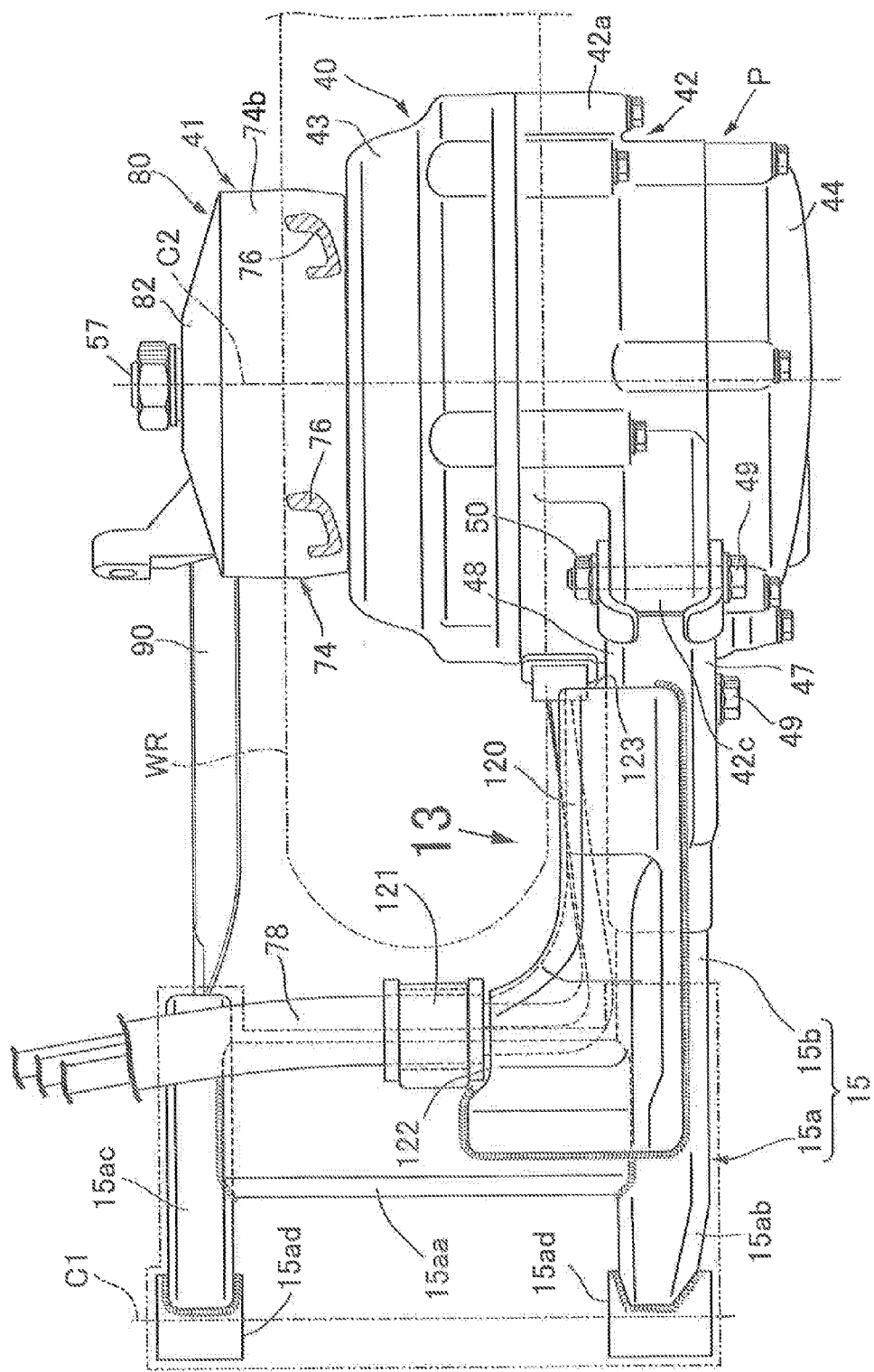
FIG. 6 is a partially cutaway cross-sectional plan view of a swing arm and a power unit. (first embodiment)
Figure 7:
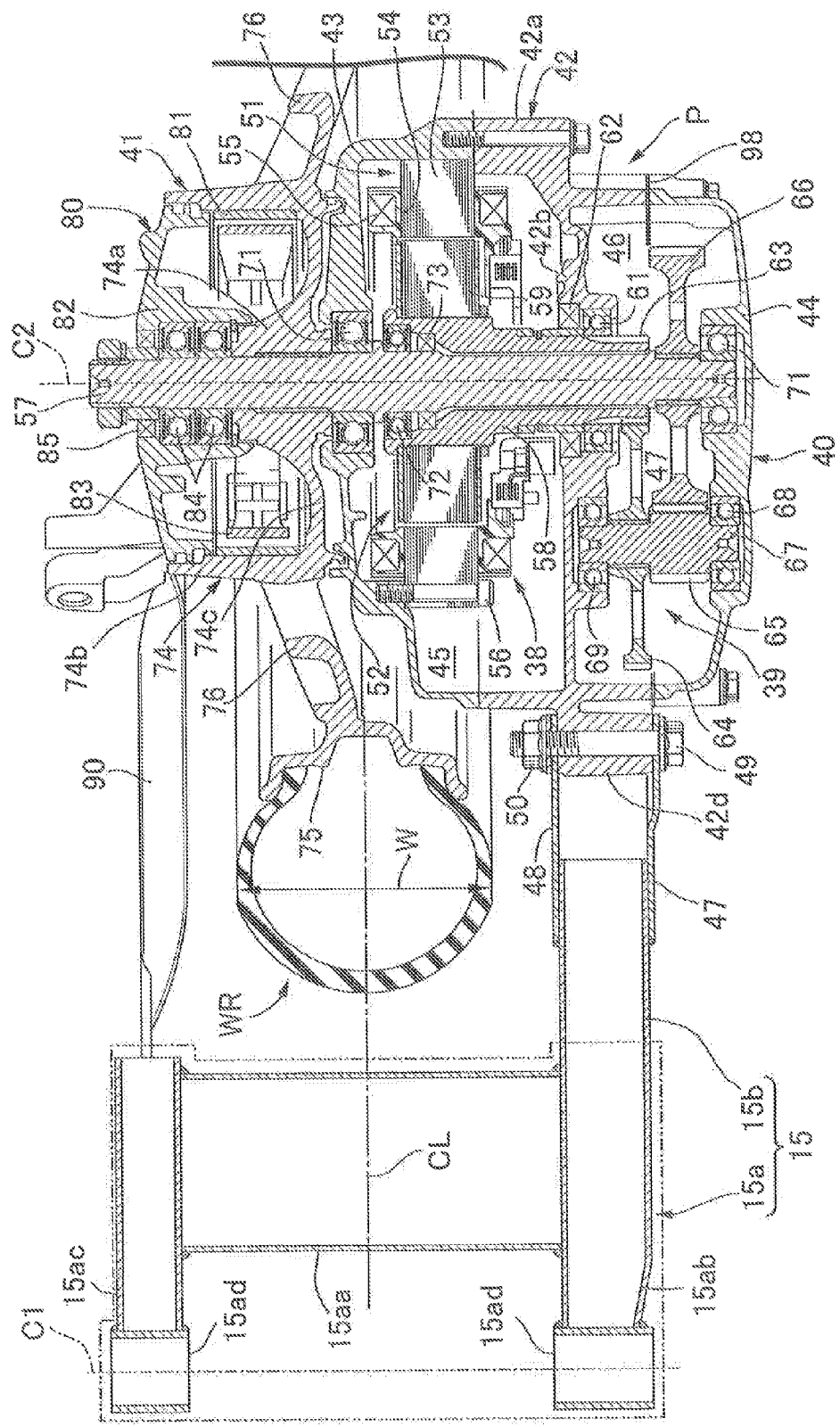
FIG. 7 is an enlarged sectional view along line 7-7 in FIG. 3. (first embodiment)

Referring in addition to FIG. 6 and FIG. 7, the swing arm 15 is formed as a cantilever type while having a swinging support portion 15a that is disposed in front of the rear wheel WR and pivotably supported on the pivot frames 24 via the support shaft 33, and an arm portion 15b that is provided to be connected to one side (left-hand side in the vehicle width direction in this embodiment) in the vehicle width direction of the swinging support portion 15a so as to be disposed on one side (left-hand side in this embodiment) of the rear wheel WR.

The swinging support portion 15a is formed from a cross portion 15aa that extends lengthwise in the vehicle width direction, a pair of left and right support arm portions 15ab and 15ac that are provided to be connected to left and right sides of the cross portion 15aa and extend forwardly, and support tube portions 15ad and 15ad that are provided in front end parts of the support arm portions 15ab and 15ac so as to be supported by the support shaft 33 provided between the pair of left and right the pivot frames 24, and in FIG. 6 and FIG. 7 the part encompassed by the double-dotted broken line corresponds to the swinging support portion 15a. Furthermore, the arm portion 15b is formed so as to extend rearwardly while being connected integrally to, among the left and right support arm portions 15ab and 15ac of the swinging support portion 15a, the left support arm portion 15ab.

A central axis C1 of the support shaft 33, as shown in FIG. 1 to FIG. 4, is disposed beneath a center of rotation C2 of the rear wheel WR and in front of a rear face 28a of the battery box 28.

The pair of support tube portions 15ad, through which the support shaft 33 is inserted, are provided in an upper part at the front end of the swing arm 15, and the support shaft 33 is provided between lower parts at the rear end of the pivot frames 24 so as to have a gap g (see FIG. 3) such that interference between the swing arm 15 and the battery box 28 can be avoided, the gap g being formed between a lower face at the rear end of the battery box 28 supported by the subframes 23 and an upper face of the swing arm 15 immediately below the rear end of the battery box 28.

Figure 8:
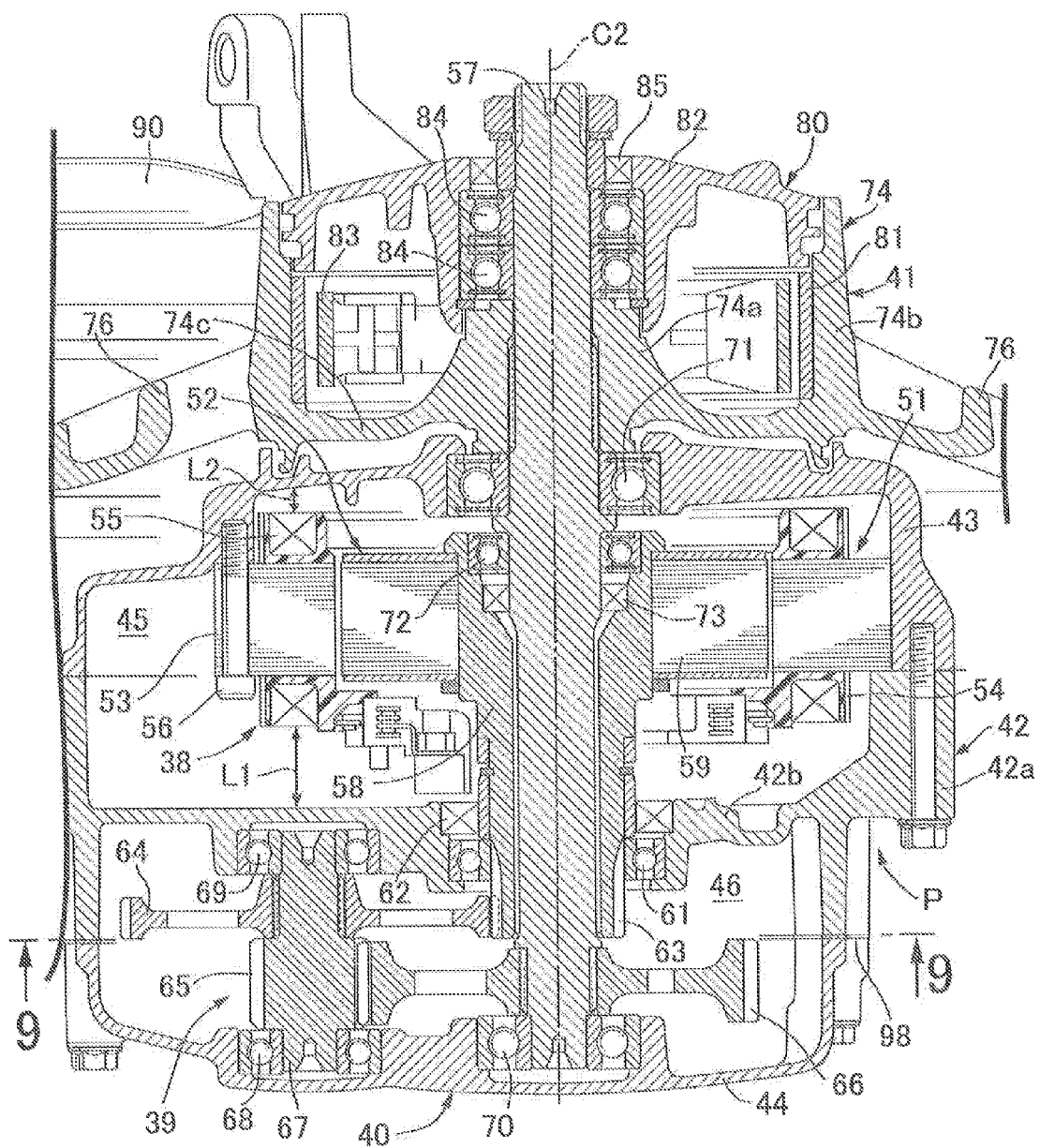
FIG. 8 is an enlarged view of an essential part in FIG. 7. (first embodiment)

Referring in addition to FIG. 8, the power unit P is formed from an electric motor 38 that receives a power supply from the battery 27 and exerts power to drive the rear wheel WR, a reduction gear 39 that reduces in speed the output of the electric motor 38 and transmits it to the wheel 41 of the rear wheel WR, and a power unit case 40 that houses the electric motor 38 and the reduction gear 39.

The power unit case 40 is formed from a case main body 42 that is supported on a rear part of the arm portion 15b of the swing arm 15, a motor cover 43 that is joined to the case main body 42 so as to form between itself and the case main body 42 a motor housing 45 housing the electric motor 38, and a reduction gear cover 44 that is joined to the case main body 42 so as to form between itself and the case main body 42 a reduction gear housing 46 housing the reduction gear 39.

The case main body 42 integrally has a tubular outer shell portion 42a that opens on opposite sides in the vehicle width direction, a partition wall 42b that is provided integrally with the outer shell portion 42a so as to divide the interior of the outer shell portion 42a into two sides in the vehicle width direction, a first mounting portion 42c that protrudes upwardly to the front from an upper part on the front side of the outer shell portion 42a, a second mounting portion 42d that protrudes forwardly from a front part of the outer shell portion 42a, and a third mounting portion 42e that protrudes downwardly from a lower part on the front side of the outer shell portion 42a. The motor housing 45 and the reduction gear housing 46 are formed within the power unit case 40 so as to be adjacent to each other with the partition wall 42b of the case main body 42 disposed therebetween.

On the other hand, support plates 47 and 48 sandwiching the first to third mounting portions 42c to 42e of the case main body 42 from left and right sides are fixed to a rear part of the arm portion 15b, and the first to third mounting portions 42c to 42e are secured to the support plates 47 and 48 by means of bolts 49 and nuts 50. Therefore, the case main body 42, that is the power unit case 40, is detachably mounted on the arm portion of the swing arm 15.

In a state in which the power unit case 40 is supported on the arm portion 15b of the swing arm 15, a wheel 41 of the rear wheel WR is disposed on the other side (right-hand side) in the vehicle width direction of the motor cover 43. With regard to the power unit P, the reduction gear 39 is disposed to one side in the vehicle width direction with the rear wheel WR on the opposite side with respect to the electric motor 38, and the electric motor 38 is supported on the arm portion 15b so as to be disposed closer to the vehicle body center line CL side than the reduction gear 39 in the vehicle width direction.

The electric motor 38 includes a stator 51 fixed to the motor cover 43 and a rotor 52 coaxially disposed within the stator 51. The stator 51 has a stator core 53 that is secured to the motor cover 43 by means of a plurality of bolts 56, a bobbin 54 that is fitted around the stator core 53, and a coil 55 that is fitted around the bobbin 54. The rotor 52 is formed such that a motor shaft 58 is formed into a tube shape while having an axle 57 of the rear wheel WR coaxially extending therethrough and has one end part rotatably extending through the partition wall 42b and projecting into the reduction gear housing 46, a rotor core 59 being fixed to the other end part of the motor shaft 58.

Moreover, the electric motor 38 is housed in the motor housing 45 such that an axial maximum distance L1 between the coil 55 and the partition wall 42b on one end side of the stator 51 is larger than an axial maximum distance L2 between the coil 55 and the motor cover 43 on the other end side of the stator 51.

Disposed between the motor shaft 58 and the partition wall 42b are a first ball bearing 61 and a first oil seal 62 that is adjacent to the first ball bearing 61 on the motor housing 45 side.

Figure 9:
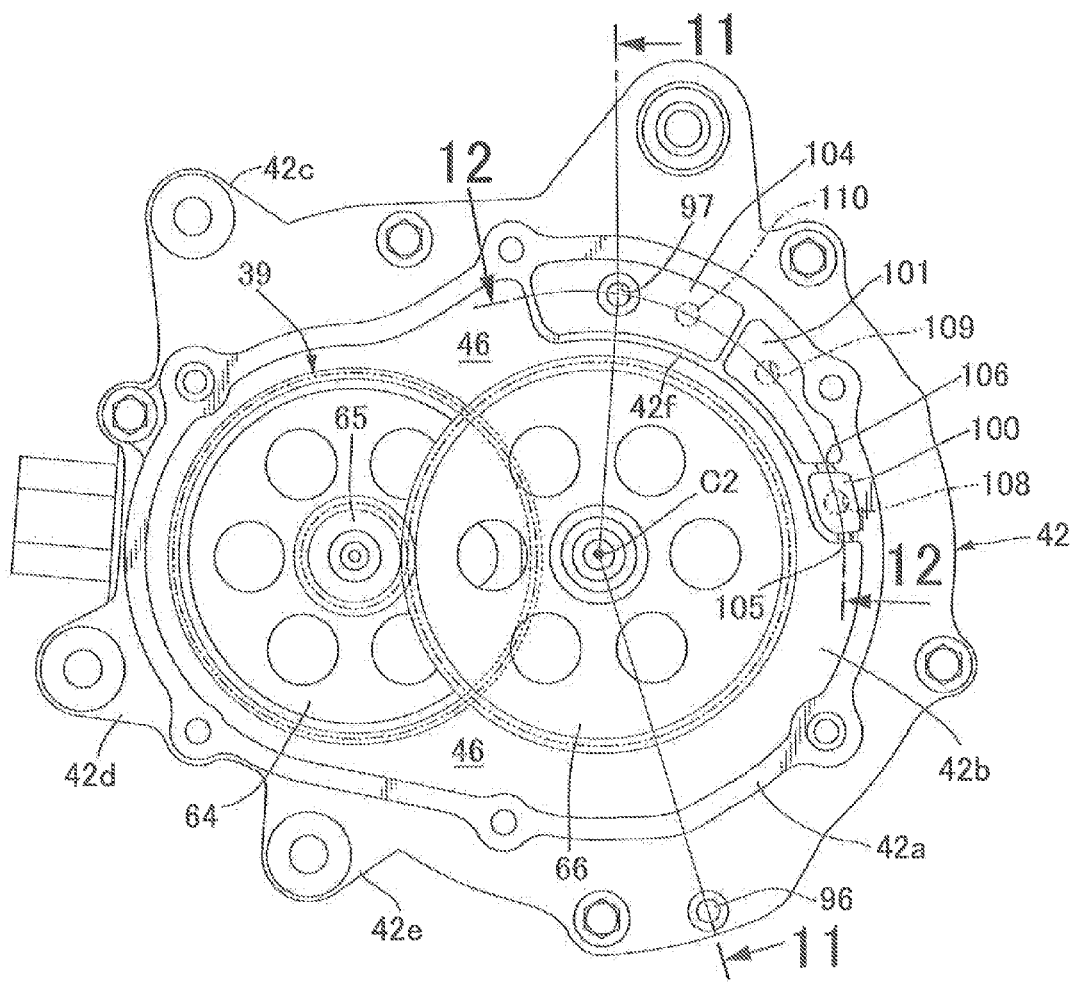
FIG. 9 is a sectional view along line 9-9 in FIG. 8. (first embodiment)

Referring in addition to FIG. 9, the motor shaft 58 is operatively linked to the reduction gear 39, which is disposed further outside than the electric motor 38, the reduction gear 39 being formed from a drive gear 63 that is formed integrally with the one end part of the motor shaft 58, a first idle gear 64 that meshes with the drive gear 63, a second idle gear 65 that rotates together with the first idle gear 64, and a driven gear 66 that meshes with the second idle gear 65.

The first idle gear 64, which is formed with a larger diameter than that of the drive gear 63, is fixed to an idle shaft 67, and the second idle gear 65, which is formed with a smaller diameter than that of the first idle gear 64, is formed integrally with the idle shaft 67. One end part of the idle shaft 67 is rotatably supported on the reduction gear cover 44 via a second ball bearing 68, and the other end part of the idle shaft 67 is rotatably supported on the partition wall 42b of the case main body 42 via a third ball bearing 69. The rotational power from the reduction gear 39 is transmitted to the axle 57, which rotatably extends through a central part of the motor cover 43 of the power unit case 40, the driven gear 66 of the reduction gear 39 is fixed to one end part of the axle 57, and the wheel 41 of the rear wheel WR is fixed to the other end part of the axle 57. This axle 57 is rotatably supported by both the motor cover 43 and the reduction gear cover 44, a fourth ball bearing 70 being disposed between the one end part of the axle 57 and the reduction gear cover 44, and a seal-equipped fifth ball bearing 71 being disposed between an intermediate part of the axle 57 and the motor cover 43.

Furthermore, the motor shaft 58 is rotatably supported on both the axle 57 and the case main body 42; as described above, the first ball bearing 61 and the first oil seal 62 are disposed between the outer periphery of the motor shaft 58 and the partition wall 42b of the case main body 42, and a seal-equipped sixth ball bearing 72 and a second oil seal 73 disposed further toward the reduction gear housing 46 side than the sixth ball bearing 72 are disposed between the axle 57 and the inner periphery of the other end part of the motor shaft 58.

The wheel 41 is formed from a wheel hub 74 that is fixed to the axle 57, a rim 75 that coaxially surrounds the wheel hub 74 while having a tire 77 fitted thereto, and a plurality of spokes 76 that link the rim 75 and the wheel hub 74.

Moreover, the wheel hub 74 is formed so as to integrally have an inner tube portion 74a through which the axle 57 is inserted, an outer tube portion 74b that coaxially surrounds the inner tube portion 74a, and a linking wall 74c that links end parts, on the power unit P side, of the inner tube portion 74a and the outer tube portion 74b. The inner tube portion 74a is fixed to the axle 57.

The wheel hub 74 is disposed offset toward the other side (right-hand side) in the vehicle width direction from the center of the rim 75 in a direction along the axis of the axle 57, and the plurality of spokes 76 linking the outer tube portion 74b of the wheel hub 74 to the rim 75 are disposed in an inclined manner so as to be positioned on the other side (right-hand side) in the vehicle width direction in going toward the wheel hub 74 side.

At least part of the electric motor 38, a majority of the electric motor 38 in this embodiment, is disposed within a width W of the tire 77 fitted around the rim 75.

Provided on the wheel 41 of the rear wheel WR is a drum brake 80, which is a wheel brake, the drum brake 80 being accessible from the other side (right-hand side) in the vehicle width direction, which is the side opposite to the power unit P. This drum brake 80 includes a brake drum 81 that is provided on the inner periphery of the outer tube portion 74b of the wheel hub 74, a brake panel 82 that is relatively rotatably supported on the axle 57 so as to close an open end part on the side opposite to the power unit P between the inner tube portion 74a and the outer tube portion 74b, and a pair of brake shoes 83 that are pivotably supported on the brake panel 82 while enabling sliding contact with the brake drum 81. At least part of this drum brake 80 is disposed at a position offset outward from the width W of the tire 77.

Disposed between the brake panel 82 and the axle 57 are a pair of seal-equipped seventh ball bearings 84 and 84 and an annular seal member 85 disposed on the outer side of the seventh ball bearings 84.

Referring to FIG. 2 and FIG. 4, the brake panel 82 pivotably supports a camshaft 86 for pivoting the brake shoes 83 in response to pivoting, and a brake cable 88 is linked to an extremity part of an arm 87 having its base end part fixed to the camshaft 86 on the outer side of the brake panel 82, the brake cable 88 being pulled in response to a braking operation by a rider.

Furthermore, a rotation-preventing member 90 is provided between the swinging support portion 15a of the swing arm 15 and the brake panel 82 so as to restrict rotation of the brake panel 82, the rotation-preventing member 90 being formed into a rod shape extending in the fore-and-aft direction of the vehicle body frame F.

Secured portions 90a and 90b are formed on front and rear end parts respectively of the rotation-preventing member 90, and mounting parts 91 and 92 for securing the secured portions 90a and 90b are provided on a right end part of the swinging support portion 15a and the brake panel 82 respectively so as to overlap the secured portions 90a and 90b.

Figure 10:
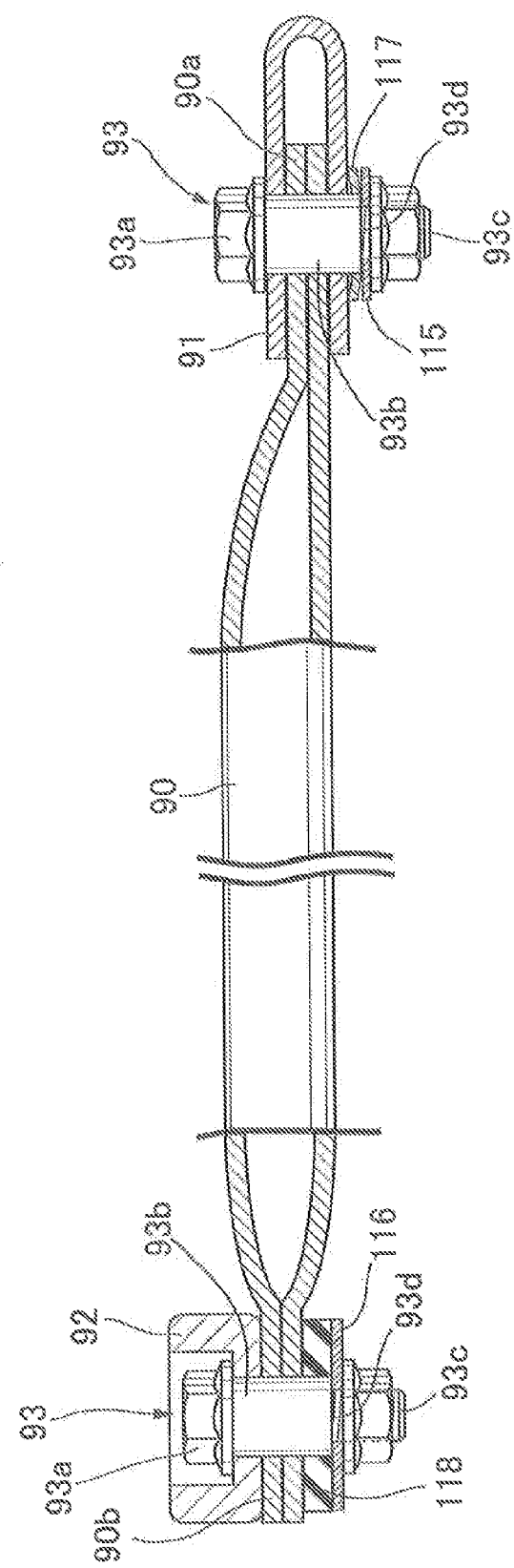
FIG. 10 is a sectional view along line 10-10 in FIG. 4. (first embodiment)

In FIG. 10, the rotation-preventing member 90 is formed by flattening a pipe, and the secured portions 90a and 90b are formed by crushing into a flat shape. Moreover, the mounting part 91 of the swinging support portion 15a is formed so as to sandwich the secured portion 90a in the front end part of the rotation-preventing member 90 from opposite sides, the mounting part 92 of the brake panel 82 abuts against the secured portion 90b in the rear end part of the rotation-preventing member 90 from the inner side in the vehicle width direction, and the secured portions 90a and 90b are mounted on the mounting parts 91 and 92 by means of bolts 93 and 93 inserted through the secured portions 90a and 90b and the superimposed mounting parts 91 and 92, and nuts 94 and 94 screwed onto the bolts 93.

The bolt 93 is formed with a step while integrally having an enlarged diameter head portion 93a that abuts against and engages with an outer face on the inner side of one of the secured portions 90a and 90b and the mounting parts 91 and 92, in this embodiment the mounting parts 91 and 92, a through-shaft portion 93b that is coaxially connected to the enlarged diameter head portion 93a so as to extend through the secured portions 90a and 90b and the superimposed mounting parts 91 and 92, and a threaded shaft portion 93c that is formed so as to have a smaller diameter than that of the through-shaft portion 93b and is coaxially connected to the through-shaft portion 93b. The nuts 94 are screwed onto the threaded shaft portions 93c of the bolts 93 such that an elastic member is disposed between the nuts 94 and the mounting parts 91 and 92 or the secured portions 90a and 90b.

An annular step portion 93d is formed between the through-shaft portion 93b and the threaded shaft portion 93c of the bolt 93. In this embodiment, the nut 94 is screwed onto the threaded shaft portion 93c of the bolt 93 inserted through the secured portion 90a and the mounting part 91 so as to abut against a washer 115 engaging with the annular step portion 93d, a plate spring 117, which is an elastic member, being sandwiched between the washer 115 and the mounting part 91, and the nut 94 is screwed onto the threaded shaft portion 93c of the bolt 93 inserted through the secured portion 90b and the mounting part 92 so as to abut against a washer 116 engaging with the annular step portion 93d, a rubber material 118, which is an elastic member, being sandwiched between the washer 116 and the secured portion 90b. That is, the nuts 94 are screwed onto the threaded shaft portions 93c of the bolts 93 with the plate spring 117 and the rubber material 118 disposed between the nuts 94 and the mounting part 91 and secured portion 90b.

Figure 11:
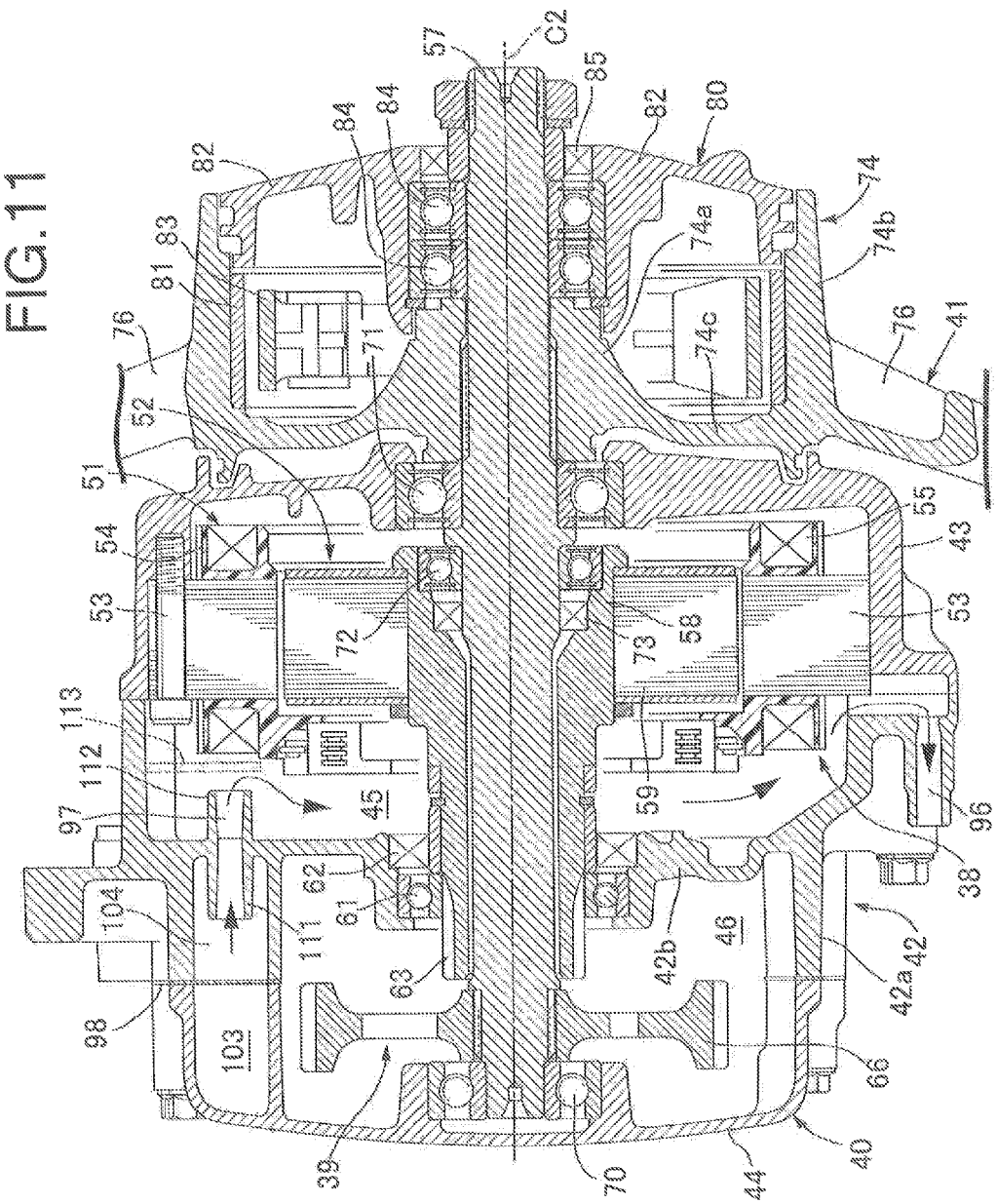
FIG. 11 is a sectional view along line 11-11 in FIG. 9. (first embodiment)

Referring in addition to FIG. 11, a drain hole 96 communicating with a lower part of the motor housing 45 is provided in lower parts of the case main body 42 and the motor cover 43 of the power unit case 40 so as to open to the outside on the side opposite to the wheel 41 of the rear wheel WR with respect to the electric motor 38, and the partition wall 42b is provided with a communication hole 97 providing communication between the reduction gear housing 46 and the motor housing 45.

Figure 12:
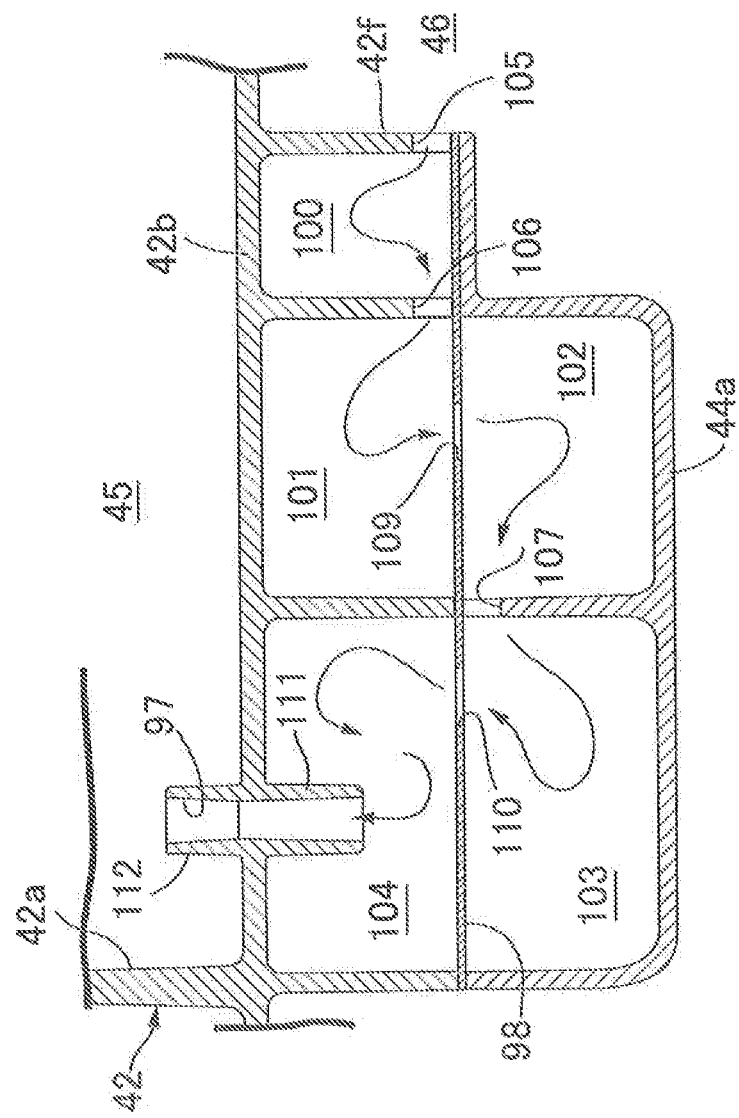
FIG. 12 is a sectional view along line 12-12 in FIG. 9. (first embodiment)

Referring in addition to FIG. 12, a plurality of breather chambers 100 to 104 communicating with each other are formed between the case main body 42 and the reduction gear cover 44, or in either the case main body 42 or the reduction gear cover 44, and in this embodiment the first to fifth breather chambers 100, 101, 102, 103, and 104 are formed between the case main body 42 and the reduction gear cover 44 with a gasket 98 disposed therebetween. Moreover, among the first to fifth breather chambers 100 to 104, the fifth breather chamber 104, which is the breather chamber at the terminal end in the flow direction, communicates with the communication hole 97.

The case main body 42 is provided integrally with a wall portion 42f for forming, among the first to fifth breather chambers 100 to 104, the first, second, and fifth breather chambers 100, 101, and 104 between the gasket 98 and the partition wall 42b, and the reduction gear cover 44 is provided integrally with a wall portion 44a for forming, among the first to fifth breather chambers 100 to 104, the third and fourth breather chambers 102 and 103 between the gasket 98 and the reduction gear cover 44. At least some of the first to fifth breather chambers 100 to 104, in this embodiment the second to fourth breather chambers 101 to 104, are formed on opposite sides of the gasket 98.

Moreover, a groove-shaped inlet 105 is provided in an end part, on the gasket 98 side, of a lower part of the wall portion 42f of the case main body 42, the inlet 105 providing communication between the reduction gear housing 46 and the first reservoir chamber 99, a groove-shaped passage 106 is provided in an end part, on the gasket 98 side, of the wall portion 42f at a position between the first and second breather chambers 100 and 101, the passage 106 providing communication between the first and second breather chambers 100 and 101, and a groove-shaped passage 107 is provided in an end part, on the gasket 98 side, of the wall portion 44a of the reduction gear cover 44, the passage 107 providing communication between the third and fourth breather chambers 102 and 103. Furthermore, the gasket 98 is provided with a passage hole 109 providing communication between the second and third breather chambers 101 and 102 and a passage hole 110 providing communication between the fourth and fifth breather chambers 103 and 104.

The first to fifth breather chambers 100 to 104 are disposed so to be positioned stepwise upward in going toward the communication hole 97 side. The first breather chamber 100, which is the breather chamber at the lowermost position, communicates with the interior of the reduction gear housing 46 via the inlet 105, and the communication hole 97 opens in an upper part of the fifth breather chamber 104, which is the breather chamber at the uppermost position.

Moreover, a tubular part 111 protruding from the partition wall 42b toward the fifth breather chamber 104, which is the breather chamber at the terminal end in the flow direction, is projectingly formed integrally with the partition wall 42b so as to form part of the communication hole 97. A tubular part 112, which is coaxial with the tubular part 111, is projectingly provided integrally with the partition wall portion 42b so as to protrude toward the motor housing 45 side, and the communication hole 97 is formed in the two tubular parts 111 and 112 and the partition wall 42b.

In order to avoid gas flowing from the communication hole 97 toward the motor housing 45 side from impinging directly on the electric motor 38, as shown by the double-dotted broken line in FIG. 11 a baffle plate 113 disposed between the electric motor 38 and the open end, on the motor housing 45 side, of the communication hole 97 may be projectingly provided integrally with an inner face of the outer shell portion 42a of the case main body 42.

As shown in FIG. 1 to FIG. 4, a power drive unit 119 that converts direct current from the battery 27 into three-phase alternating current and controls and supplies the alternating current to the electric motor 38 of the power unit P is supported on the rear frame 21 of the vehicle body frame F so as to be positioned obliquely upward and to the rear of the battery box 28, and a three-phase electric cable 78 extending from the power drive unit 119 is connected to the stator 51 of the electric motor 38 of the power unit P.

Figure 13:
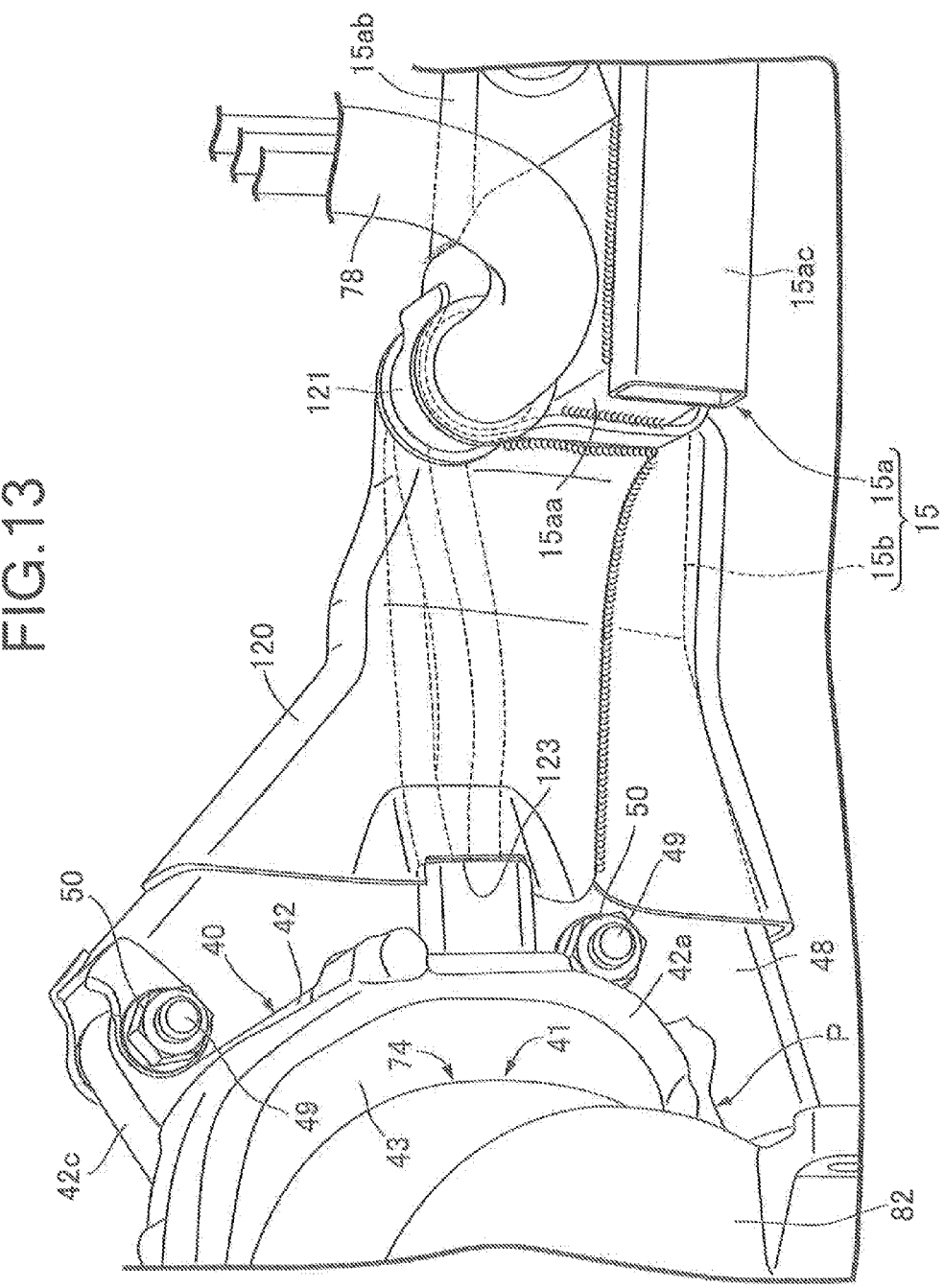
FIG. 13 is a perspective view from the direction of arrow 13 in FIG. 6. (first embodiment)

In FIG. 13, fixed to the swing arm 15 is a cover gusset 120 covering a left upper part of the swinging support portion 15a of the swing arm 15 and an upper part, lower part, and inner side of the arm portion 15b. The electric cable 78, which extends from the power drive unit 119 disposed above the swing arm 15, is inserted between the gusset 120 and the swing arm 15. Moreover, a holder 121 is provided in an upper part of the swinging support portion 15a, the holder 121 holding the electric cable 78, which extends from the power drive unit 119 thereabove, partway along the electric cable 78. The electric cable 78 held by the holder 121 is inserted between the gusset 120 and the swing arm 15 through an inlet 122 (see FIG. 6) formed between the gusset 120 and a left upper part of the swinging support portion 15a, and the electric cable 78 led out through an outlet 123 formed between the arm portion 15b and the gusset 120 so as to oppose the front end of the case main body 42 of the power unit case 40 is led into the case main body 42 of the power unit case 40.

The operation of this embodiment is now explained. The battery box 28, which houses the battery 27 for supplying power to the electric motor 38 of the power unit P, is disposed between the pair of left and right rear frames 21 beneath the riding seat 30, and the single support shaft 33, which swingably supports the front end part of the swing arm 15 on the vehicle body frame F, is disposed beneath the battery box 28, therefore making it possible to avoid any increase in the number of assembly steps while easily ensuring the support strength for the swing arm 15 by enabling the swing arm 15 to be supported by the single support shaft 33 without setting the supported part of the swing arm 15 so as to be to the rear of the battery box 28. Furthermore, it becomes possible, by ensuring the length in the fore-and-aft direction of the swing arm 15 and reducing an angle $\alpha$ (see FIG. 3) formed between a straight line LL joining the central axis C1 of the support shaft 33 to the contact point of the tire 77 of the rear wheel WR when viewed from the side and the road surface in front of the contact point of the tire 77, to reduce the upward component of a reaction force received from the road surface when the rear wheel WR is driven by the power unit P provided on the swing arm 15, and it becomes possible, by setting the anti-squat percentage at the time of acceleration and the anti-lift percentage at the time of deceleration so as to be small values, to reduce the influence of the road surface on the rear wheel WR and suppress vibration.

Furthermore, since the vehicle body frame F includes the pair of subframes 23 supporting the battery box 28 and the pair of pivot frames 24 each provided to be connected to the lower parts of the subframes 23 and extending downwardly, and the support shaft 33 is provided between the two pivot frames 24, it is possible to ensure the support rigidity for the swing arm 15.

Moreover, since the central axis C 1 of the support shaft 33 is disposed beneath the center of rotation C2 of the rear wheel WR, it is possible to further reduce the angle α (see FIG. 3) formed between the straight line LL joining the central axis C1 of the support shaft 33 to the contact point of the tire 77 of the rear wheel WR and the road surface in front of the contact point of the tire 77, thus further reducing the influence of the road surface on the rear wheel WR and thereby suppressing vibration during travel more effectively. Moreover, since the central axis C1 of the support shaft 33 is present in front of the rear face 28a of the battery box 28, it is possible to ensure a sufficient length in the fore-and-aft direction for the swing arm 15.

Furthermore, the pair of support tube portions 15ad, through which the support shaft 33 is inserted, are provided in the upper part at the front end of the swing arm 15, the support shaft 33 is provided between the lower parts at the rear end of the pair of pivot frames 24 with the gap g opening between the lower face at the rear end of the battery box 28 supported by the subframes 23 and the upper face of the swing arm 15 immediately below the rear end of the battery box 28, the gap g enabling interference between the swing arm 15 and the battery box 28 to be avoided, and it is therefore possible to ensure there is space for the swing arm 15 to swing while avoiding interference between the swing arm 15 and the battery box 28 even with a structure in which the battery box 28 is supported by the subframes 23 and the swing arm 15 is swingably supported, via the support shaft 33, on the pivot frames 24 provided to be connected to the lower parts of the subframes 23.

Furthermore, since the main stand 34 is pivotably supported on the support shaft 33, it is possible to dispose the swing arm 15 and the main stand 34 together in a compact manner, the number of components can be reduced, and the operation of raising the main stand 34 becomes easy by disposing the main stand 34 beneath the battery box 28, which is heavy.

Moreover, since the middle part in the vehicle width direction of the cross pipe 20, which extends in the vehicle width direction and is disposed beneath the battery box 28, is fixed to the rear end part of the lower frame 19b of the main frame 19, and the front end parts of the pair of rear frames 21 are fixed to the opposite end parts of the cross pipe 20, the pair of rear frames 21 are provided to be connected to the rear end part of the lower frame 19b via the cross pipe 20 extending in the vehicle width direction beneath the battery box 28, and it is possible to ensure sufficient support rigidity for the battery box 28.

Furthermore, since the reinforcing frame 25, which is made into a substantially U-shaped form opening upwardly, is fixed to the rear end parts of the pair of subframe 23, and the opposite end parts of the reinforcing frame 25 are fixed to the rear frames 21, it is possible to strengthen the support rigidity of the subframes 23.

Moreover, the power unit P is arranged such that the reduction gear 39 is disposed to one side with the rear wheel WR on the opposite side with respect to the electric motor 38 and the electric motor 38 is disposed closer to the vehicle body center line CL side than the reduction gear 39 in the vehicle width direction, and the drum brake 80 is provided on the wheel 41 of the rear wheel WR so as to be accessed from the other side in the vehicle width direction, which is the side opposite to the power unit P, therefore making it possible to easily access, from the other side in the vehicle width direction, the tire 77 and the drum brake 80, which have a high priority for maintenance, while eliminating the necessity for removing not only the electric motor 38 and the reduction gear 39 but also the drum brake 80 when changing the tire 77 and also eliminating the necessity for removing the tire 77 when carrying out maintenance of the drum brake 80 and, moreover, it is possible to obtain a good weight balance by disposing the electric motor 38, which is heavy, close to the vehicle body center line CL in the vehicle width direction.

Furthermore, the wheel hub 74 of the wheel 41 of the rear wheel WR is formed so as to integrally have the inner tube portion 74a, through which the axle 57 of the rear wheel WR is inserted, the outer tube portion 74b coaxially surrounding the inner tube portion 74a, and the linking wall 74c linking the end parts, on the power unit P side, of the inner tube portion 74a and the outer tube portion 74b, and the drum brake 80 has the brake drum 81 provided on the inner periphery of the outer tube portion 74b, and the brake panel 82 relatively rotatably supported on the axle 57 while closing the open end parts on the side opposite to the power unit P between the inner tube portion 74a and the outer tube portion 74b, therefore making it possible to achieve a compact structure.

Moreover, since the seventh ball bearing 84 is disposed between the brake panel 82 and the axle 57, and the rotation-preventing member 90 for restricting rotation of the brake panel 82 is provided between the swinging support portion 15a of the swing arm 15 and the brake panel 82, it is possible to support the power unit P solely by the arm portion 15b of the cantilever type swing arm 15 and receive the rotational force acting on the brake panel 82 solely by the swinging support portion 15a.

Furthermore, the rotation-preventing member 90 is formed into a rod shape extending in the fore-and-aft direction of the vehicle body frame F, the secured portions 90a and 90b are formed on the front and rear end parts of the rotation-preventing member 90 respectively, the mounting parts 91 and 92 for securing the secured portions 90a and 90b are provided on the swinging support portion 15a and the brake panel 82 respectively so as to be superimposed on the secured portions 90a and 90b, the bolts 93 inserted through the secured portions 90a and 90b and the superimposed mounting parts 91 and 92 are formed with a step while integrally having the enlarged diameter head portions 93a, which abut against and engage with one from among the secured portions 90a and 90b and the mounting parts 91 and 92, the through-shaft portions 93b, which are coaxially connected to the enlarged diameter head portion 93a so as to extend through the secured portions 90a and 90b and the superimposed mounting parts 91 and 92, and the threaded shaft portions 93c, which are formed so as to have a smaller diameter than that of the through-shaft portions 93b and are coaxially connected to the through-shaft portions 93b, and the nuts 94 are screwed onto the threaded shaft portions 93c of the bolts 93 so that the plate spring 117 and the rubber material 118 are disposed between the nuts 94 and the mounting part 91 and secured portion 90b; it is therefore possible to ensure that the secured portions 90a and 90b and the mounting parts 91 and 92 are not firmly tightened between the nuts 94 and the enlarged diameter head portions 93a of the bolts 93 even in a state in which the nuts 94 are tightened, thus making it easy for them to be removed and, moreover, it is inexpensive because it is not necessary to strictly determine the dimensional tolerance.

Moreover, the rim 75 of the wheel 41 and the wheel hub 74, which is disposed so as to be offset toward the other side in the vehicle width direction from the center of the rim 75 in a direction along the axis of the axle 57, are linked by means of the plurality of spokes 76, which are inclined so as to be positioned on the other side in the vehicle width direction in going toward the wheel hub 74 side, and it is therefore possible to dispose the electric motor 38 closer to the vehicle body center line CL in the vehicle width direction and to dispose the drum brake 780 at a position offset from the vehicle body center line CL toward the other side in the vehicle width direction, which is the side opposite to the power unit P.

Furthermore, since at least part of the electric motor 38 is disposed within the width W of the tire 77 fitted around the rim 75, and at least part of the drum brake 80 is disposed at a position offset to the outer side from the width W of the tire 77, it is possible to dispose the electric motor 38 more markedly close to the vehicle body center line CL in the vehicle width direction and to dispose the drum brake 80 so as to be more markedly offset toward the other side in the vehicle width direction from the vehicle body center line CL. Moreover, the weight balance between the power unit P and the rear wheel WR in the vehicle width direction can be equalized.

Furthermore, since the motor shaft 58 of the electric motor 38 is operatively linked to the reduction gear 39 disposed on one side in the vehicle width direction of the electric motor 38, and the motor shaft 58 is formed into a tubular shape so that the axle 57 extends therethrough, the rotational power from the reduction gear 39 being transmitted to the axle 57, it is possible to compactly form the power transmission system, which extends from the electric motor 38 to the axle 57, while disposing the electric motor 38 close to the vehicle body center line CL in the vehicle width direction.

Moreover, the power unit case 40 housing the power unit P is formed from the case main body 42 supported on the arm portion 15b of the swing arm 15, the motor cover 43 forming the motor housing 45 housing the electric motor 38 between itself and the case main body 42 and joined to the case main body 42, and the reduction gear cover 44 forming the reduction gear housing 46 housing the reduction gear 39 between itself and the case main body 42 and joined to the case main body 42, the axle 57 rotatably extending through the motor cover 43 is rotatably supported on both the reduction gear cover 44 and the motor cover 43, and the motor shaft 58 is rotatably supported on both the axle 57 and the case main body 42, therefore supporting the rear wheel WR solely on the cantilever type swing arm 15.

Furthermore, since the power unit P is detachably mounted on the arm portion 15b of the swing arm 15, a wider variety of ways of carrying out maintenance become possible, and it becomes possible to change the size of the power unit P and the size of the tire 77 by easily detaching the power unit P from the swing arm 15.

Moreover, the motor housing 45 and the reduction gear housing 46 are formed in the power unit case 40 so as to be adjacent to each other with the partition wall 42b disposed therebetween, the drain hole 96 communicating with the lower part of the motor housing 45 is provided in the lower part of the power unit case 40, and the communication hole 97 providing communication between the motor housing 45 and the reduction gear housing 46 is provided in the partition wall 42b; the pressure of the reduction gear housing 46 is therefore released to the atmosphere through the drain hole 96 via the communication hole 97 and the motor housing 45, and the motor housing 45 can be utilized as a large volume for gas-liquid separation by providing communication between the reduction gear housing 46 and the motor housing 45 by means of the communication hole 97.

Furthermore, since the first to fifth breather chambers 100, 101, 102, 103, and 104, which communicate with each other, are formed between the case main body 42 and the reduction gear cover 44, and the fifth breather chamber 104 which, among the breather chambers 100 to 104, is at the terminal end in the flow direction, communicates with the communication hole 97, the pressure of the reduction gear housing 46 is guided to the motor housing 45 through the communication hole 97 via the first to fifth breather chambers 100 to 104, thus improving the gas-liquid separation performance.

Moreover, since the first to fifth breather chambers 100 to 104 are disposed so as to be positioned stepwisely upward in going toward the communication hole 97 side, the lower part of the wall portion 42f forming the first breather chamber 100, which is at the lowermost position, is provided with the inlet 105 communicating with the reduction gear housing 46, and the communication hole 97 opens in the upper part of the fifth breather chamber 104, which is at the uppermost position, it is possible to easily return oil separated in each of the breather chambers 100 to 104 toward the reduction gear housing 46 side.

Furthermore, since at least some of breather chambers among the first to fifth breather chambers 100 to 104, that is, the second to fifth breather chambers 101 to 104, are formed on opposite sides of the gasket 98 so as to sandwich the gasket 98 between the case main body 42 and the reduction gear cover 44, the liquid-gas separation performance can be further improved.

Furthermore, the coil 55 is provided on the stator 51 of the electric motor 38 housed in the motor housing 45, and a relatively large space can be formed between the partition wall 42b and the electric motor 38 by making the axial maximum distance L1 between the coil 55 and the partition wall 42b on one end side of the stator 51 more than the axial maximum distance L2 between the coil 55 and the motor cover 43 on the other end side of the stator 51, thus making it possible to ensure a large volume for gas-liquid separation.

Moreover, since the power unit case 40 is supported on the swing arm 15 so that the wheel 41 of the rear wheel WR is disposed to one side of the motor cover 43, and the drain hole 96 is provided in the power unit case 40 so as to open to the outside on the opposite side of the wheel 41 with respect to the electric motor 38, it is possible to minimize the influence of a discharge from the drain hole 96 on the rear wheel WR.

Furthermore, since the tubular part 111 protruding from the partition wall 42b toward the sixth breather chamber 104, which is the terminal end in the flow direction, is projectingly provided integrally with the partition wall 42b so as to form part of the communication hole 97, it is possible to carry out further gas-liquid separation by changing the flow direction when the flow comes in from the sixth breather chamber 104 to the communication hole 97.

Moreover, as shown by the double-dotted broken line in FIG. 11, when the baffle plate 113 is provided on the power unit case 40 so as to oppose the end, opening to the motor housing 45, of the communication hole 97, breathing gas flowing from the communication hole 97 into the motor housing 45 side can be guided to the space between the partition wall 42b and the electric motor 38 while avoiding direct impingement of the breathing gas on the electric motor 38.

A mode for carrying out the present invention is explained above, but the present invention is not limited to the above embodiment and may be modified in a variety of ways as long as the modifications do not depart from the spirit and scope thereof.

The invention claimed is:

1. An electric saddle-ridden vehicle comprising a cantilever type swing arm that has a swinging support portion pivotably supported on a vehicle body frame and an arm portion provided to be connected to one side, in a vehicle width direction, of the swinging support portion so as to be disposed on one side of a rear wheel, a power unit that is supported on the arm portion while having an electric motor exerting power for driving the rear wheel and a reduction gear reducing in speed an output of the electric motor and transmitting the output to a wheel side of the rear wheel, and a wheel brake that is provided on the wheel, wherein the power unit is arranged so that the reduction gear is disposed to one side in the vehicle width direction with the rear wheel on the opposite side with respect to the electric motor and the electric motor is disposed closer to a vehicle body center line than the reduction gear in the vehicle width direction, and the wheel brake is provided on the wheel so as to be capable of being accessed from the other side in the vehicle width direction, which is the side opposite to the power unit.

2. The electric saddle-ridden vehicle according to claim 1, wherein a wheel hub of the wheel is formed so as to integrally have an inner tube portion through which an axle of the rear wheel is inserted, an outer tube portion that coaxially surrounds the inner tube portion, and a linking wall that links end parts, on the power unit side, of the inner tube portion and the outer tube portion, and the wheel brake is a drum brake having a brake drum that is provided on an inner periphery of the outer tube portion and a brake panel that is relatively rotatably supported on the axle so as to close an open end, on the side opposite to the power unit, between the inner tube portion and the outer tube portion.

3. The electric saddle-ridden vehicle according to claim 2, wherein a bearing is disposed between the brake panel and the axle, and a rotation-preventing member that restricts rotation of the brake panel is provided between the swinging support portion and the brake panel.

4. The electric saddle-ridden vehicle according to claim 3, wherein secured portions are formed on front and rear end parts of the rotation-preventing member, which is formed into a rod shape extending in the fore-and-aft direction of the vehicle body frame, mounting parts for securing the secured portions are provided on the swinging support portion and the brake panel respectively so as to be superimposed on the secured portions, a bolt inserted through the secured portion and the mounting part, which are superimposed on one another, is formed with a step while integrally having an enlarged diameter head portion that abuts against and engages with one of the secured portion and the mounting part, a through-shaft portion that is coaxially connected to the enlarged diameter head portion so as to extend through the secured portions and the mounting parts, which are superimposed on one another, and a threaded shaft portion that is formed so as to have a smaller diameter than a diameter of the through-shaft portion and is coaxially connected to the through-shaft portion, and a nut is screwed onto the threaded shaft portion with an elastic member disposed between the nut and the mounting part or secured portion.

5. The electric saddle-ridden vehicle according to claim 2, wherein a plurality of spokes link a rim of the wheel and the wheel hub, which is disposed so as to be offset toward the other side in the vehicle width direction from the center of the rim in a direction along an axis of the axle, the plurality of spokes being inclined so as to be positioned on the other side in the vehicle width direction in going toward the wheel hub side.

6. The electric saddle-ridden vehicle according to claim 5, wherein at least part of the electric motor is disposed within a width of a tire fitted around the rim, and at least part of the drum brake is disposed at a position that is offset to the outside from the width of the tire.

7. The electric saddle-ridden vehicle according to claim 2, wherein a motor shaft of the electric motor is operatively linked to the reduction gear, which is disposed on one side, in the vehicle width direction, of the electric motor, and the motor shaft is formed into a tubular shape so that the axle to which the rotational power is transmitted from the reduction gear extends therethrough.

8. The electric saddle-ridden vehicle according to claim 7, wherein a power unit case housing the power unit is formed by joining a case main body supported on the arm portion of the swing arm, a motor cover forming between the motor cover and the case main body a motor housing housing the electric motor, and a reduction gear cover forming between the reduction gear cover and the case main body a reduction gear housing housing the reduction gear, the axle rotatably extending through the motor cover is rotatably supported on both the reduction gear cover and the motor cover, and the motor shaft is rotatably supported on both the axle and the case main body.

9. The electric saddle-ridden vehicle according to claim 1, wherein the power unit is detachably mounted on the arm portion.

* * * * *

UNITED STATES PATENT AND TRADEMARK OFFICE
CERTIFICATE OF CORRECTION

| | | |
|---|---|---|
| PATENT NO. | : 9,067,615 B2 | Page 1 of 1 |
| APPLICATION NO. | : 14/359638 | |
| DATED | : June 30, 2015 | |
| INVENTOR(S) | : Kashiwai et al. | |

It is certified that error appears in the above-identified patent and that said Letters Patent is hereby corrected as shown below:

<u>On the Title Page, Item 71</u>
    Change "(KE)" to -- (JP) --

Signed and Sealed this
First Day of December, 2015

Michelle K. Lee
*Director of the United States Patent and Trademark Office*